(12) United States Patent
Aarre

(10) Patent No.: US 9,764,455 B2
(45) Date of Patent: Sep. 19, 2017

(54) PULL-OFF DEVICE FOR CONICAL PIN BUSHING AND LOCKING DEVICE FOR SCREW

(71) Applicant: Arne Aarre AS, Sandnes (NO)

(72) Inventor: Arne Aarre, Sandnes (NO)

(73) Assignee: Arne Aarre AS, Sandnes (NO)

( * ) Notice: Subject to any disclaimer, the term of this patent is extended or adjusted under 35 U.S.C. 154(b) by 0 days.

(21) Appl. No.: 15/072,443

(22) Filed: Mar. 17, 2016

(65) Prior Publication Data

US 2016/0271774 A1    Sep. 22, 2016

(51) Int. Cl.
*F16B 39/28*    (2006.01)
*B25B 27/28*    (2006.01)
*B25B 27/02*    (2006.01)

(52) U.S. Cl.
CPC .............. *B25B 27/28* (2013.01); *B25B 27/02* (2013.01); *B25B 27/023* (2013.01); *F16B 39/28* (2013.01)

(58) Field of Classification Search
CPC ....... B25B 27/28; B25B 27/02; B25B 27/023; F16B 39/28
USPC .................................................. 29/243.518
See application file for complete search history.

(56) References Cited

U.S. PATENT DOCUMENTS

| 1,599,738 A * | 9/1926 | Atkins ................. B25B 27/023 |
| | | 29/261 |
| 4,965,921 A * | 10/1990 | Priest ...................... B25B 27/02 |
| | | 29/244 |
| 5,544,402 A * | 8/1996 | O'Neil .................... B25B 27/02 |
| | | 29/261 |
| 2016/0271774 A1* | 9/2016 | Aarre ..................... F16B 39/28 |

FOREIGN PATENT DOCUMENTS

| CN | 203594670 | 5/2014 |
| DE | 19712770 | 11/1997 |
| NO | 961607 | 10/1997 |
| NO | 328050 | 11/2009 |
| WO | 2011/120268 | 10/2011 |

* cited by examiner

*Primary Examiner* — David B Jones
(74) *Attorney, Agent, or Firm* — Andrus Intellectual Property Law, LLP

(57) ABSTRACT

A pull-off device is for a radially expandable bushing on a pivot pin. An end plate is arranged to rest against a bushing end face. The end plate is arranged to be attached to a pin end face via at least one first screw which extends through a cut-out in the end plate and into a threaded bore with a first thread diameter in the pin end face. A coupling element forms a releasable, axial connection between the end plate and the bushing. The end plate is provided with at least one threaded screw hole with a second thread diameter arranged in the axial direction of the end plate and is arranged to receive a second screw which, by axial displacement towards the pin end face, subjects the end plate and the bushing to a force directed axially outwards. A locking device for a bolt is described as well.

9 Claims, 5 Drawing Sheets

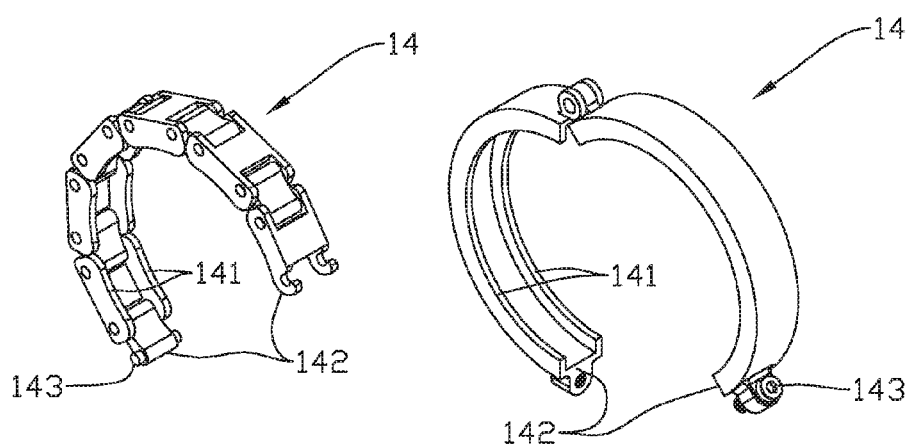
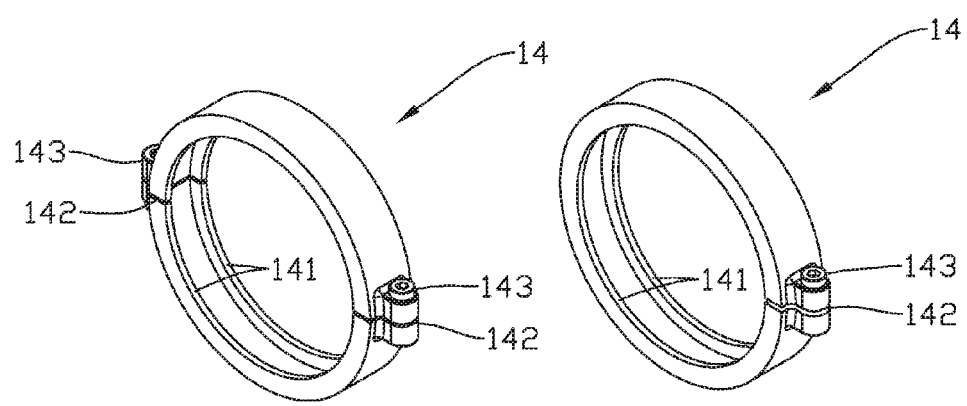

PULL-OFF DEVICE FOR CONICAL PIN BUSHING AND LOCKING DEVICE FOR SCREW

CROSS-REFERENCE TO RELATED APPLICATIONS

This application claims the benefit of and priority from Norwegian Patent Application No. 20150335, filed Mar. 17, 2015 in the Norwegian Patent Office. The Norwegian application is incorporated herein by reference, in entirety.

The invention relates to a pull-off device for a radially expandable bushing on a pivot pin, in which an end plate is arranged to rest against a bushing end face, the end plate being arranged to be attached to a pin end face by means of at least one first screw which extends through a cut-out in the end plate and into a threaded bore with a first thread diameter in the pin end face. The invention also relates to a locking device for a screw.

BACKGROUND

A pivot pin which is provided with conical bushings arranged to take up play between the pivot pin and the elements that it connects, for example as described by NO302053, requires special tools when the pivot pin is to be fitted or removed, as the conical bushings have to be pushed in over or pulled off the pivot pin with great force for the articulation to be centred or the pivot pin to be released. An example of such a tool is described in NO328050. Pivot pins like that are often of very large dimensions; for example, it is not unknown to have a pin diameter of 500 mm and a pin length of 2000 mm. Having to provide such special tools for maintenance is a disadvantage, especially since a pivot pin of this kind often has to be repaired where the machine or implement that it is fitted to is being used.

The invention has for its object to remedy or reduce at least one of the drawbacks of the prior art or at least provide a useful alternative to the prior art.

The object is achieved through the features, which are specified in the description below and in the claims that follow.

For a pivot pin including at least a pin shaft with one conical end portion for receiving a conical, radially expandable bushing arranged to be tensioned against a bore in a first articulation element, an end plate is arranged, which is arranged to rest against an outward end face of the conical bushing and subject the bushing to an axial, inward push force when at least one first screw that is arranged in a cut-out in the end plate and is engaged in a threaded, corresponding bore in an end portion of the pin shaft is being tightened. Said first screw and bore are formed with a first thread diameter. Said screw hole and bore are preferably arranged at a distance from a centre axis through the pivot pin.

At least one threaded screw hole with a second thread diameter is arranged in the end plate and is arranged to receive a second screw. Said threaded screw hole is preferably arranged at a distance from a centre axis through the pivot pin.

The threaded screw hole in the end plate is preferably arranged to receive the second screw and is then formed with a thread diameter identical to said second thread diameter, which is larger than said first thread diameter. Several screw holes are preferably arranged on a pitch circle with an inter-centre distance larger than twice the second thread diameter.

A releasable coupling element connects the end plate and the bushing in such a way that an axial outward displacement of the end plate results in the bushing being pulled away from its engagement in the bore in the first articulation element. The coupling element is preferably provided as a coupling ring which is arranged to enclose the periphery of the end plate and to rest with inward-projecting edge portions against one or more faces facing away from the outward end face of the conical bushing, for example by engaging with a groove on an external periphery of the bushing or by grip-ping around an outward-projecting flange on the bushing, and to rest against a portion of an outward end face of the end plate. The coupling element is preferably provided with at least one lockable split for the coupling element to be easily removed from its engagement with the end plate and the bushing.

By screwing the second screw into the threaded screw hole of the end plate and into abutment against the end face of the pin shaft, the end plate may be moved away from the pin shaft, and the coupling element, which holds the end plate and bushing together, ensures that the bushing is pulled loose from the pin shaft and the bore of the first articulation element. In an embodiment in which the first and second screws are placed in the same screw hole in the end plate, it is an advantage if the end plate, before the second screw is screwed in, is rotated so that the second screw will not touch the threaded bore in the end portion of the pin shaft.

In a preferred embodiment, when receiving the first screw, the threaded screw hole is provided with a screw-hole bushing. The screw-hole bushing is provided with external threads arranged to engage with the threads in the screw hole. In a preferred embodiment, said threads and also the threads of the second screw are turned in the opposite direction to those of the first screw. A centre bore of the screw-hole bushing has a dimension that allows the threaded portion of the first screw to be passed through the bushing.

By providing the screw-hole bushing with a collar and outward-projecting lips which may be bent up into abutment against side faces of the screw head of the first screw, the first screw may be locked in a very effective way, as any tendencies of the first screw to unscrew itself, will immediately be prevented by such a rotary motion resulting in the screw-hole bushing screwing itself inwards in the threaded screw hole.

SUMMARY

The invention is defined by the independent claim(s). The dependent claims define advantageous embodiments of the invention.

In a first aspect, the invention relates more specifically to a pull-off device for a radially expandable bushing on a pivot pin, in which an end plate is arranged to rest against a bushing end face as the end plate is arranged to be attached to a pin end face by means of at least one first screw which extends through a cut-out in the end plate and into a threaded bore with a first thread diameter in the pin end face, characterized by
  a coupling element forming a releasable, axial connection between the end plate and the bushing,
  the end plate being provided with at least one threaded screw hole with a second thread diameter arranged in the axial direction of the end plate and being arranged to receive a second screw which by axial displacement towards the pin end face subjects the end plate and the bushing to a force directed axially outwards.

The coupling element may rest against an outward end face of the end plate and against one or more abutment faces facing away from the outward end face of the bushing.

Several cut-outs for the first screw and several threaded screw holes for the second screw may be arranged at a radial distance from the centre axis of the pivot pin.

Several cut-outs for the first screw and several threaded screw holes for the second screw may coincide and be arranged, evenly distributed, on a pitch circle around the centre axis of the pivot pin.

Several cut-outs for the first screw and several threaded screw holes for the second screw may coincide and be arranged, evenly distributed, on a pitch circle around the centre axis of the pivot pin with an inter-centre distance equal to at least twice the thread diameter of the threaded screw hole.

The thread diameter of the first screw may be smaller than the thread diameter of the second screw.

The threaded screw hole may be arranged to receive a screw-hole bushing provided with an external thread portion corresponding to the thread dimension of the threaded screw hole, and with an internal bore extending through it, forming the cut-out for the first screw.

A thread direction of the second screw, the external thread portion of the screw-hole bushing and the threaded screw hole in the end plate may be the opposite of a thread direction of the first screw and the threaded bore of the pin end face; and an end portion of the screw-hole bushing may be salient and be provided with at least one lip which is arranged for releasable abutment against a side face of the screw head.

In a second aspect, the invention relates more specifically to a locking device for a screw which exhibits a first thread diameter and which extends through a screw hole in a first element and into a threaded bore in a second element, characterized by
the screw hole being threaded with a second thread diameter and being arranged to receive a screw-hole bushing provided with an external thread portion, which corresponds to the thread dimension of the threaded screw hole, and with an internal bore extending through it, forming a cut-out for the screw, the second thread diameter being larger than the first thread diameter;
a thread direction of the external thread portion of the screw-hole bushing and the threaded screw hole in the first element being the opposite of a thread direction of the screw and the threaded bore of the second element; and
an end portion of the screw-hole bushing being salient and being provided with at least one lip which is arranged to releasably abut against a side face on a screw head of the screw.

BRIEF DESCRIPTION OF THE DRAWINGS

In what follows, examples of preferred embodiments are described, which are visualized in the accompanying drawings, in which:

FIGS. 4a-d shows perspective drawings, on a smaller scale, of several embodiments of the coupling ring;

DETAILED DESCRIPTION OF THE DRAWINGS

Figure 1:
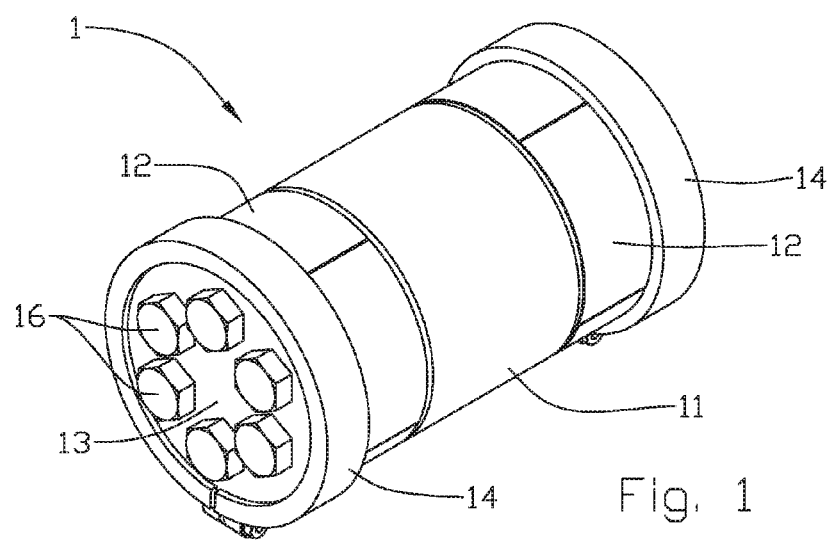
FIG. 1 shows, in perspective, a pivot pin provided with a coupling ring which connects an end plate and an adjacent conical bushing.
Figure 2:
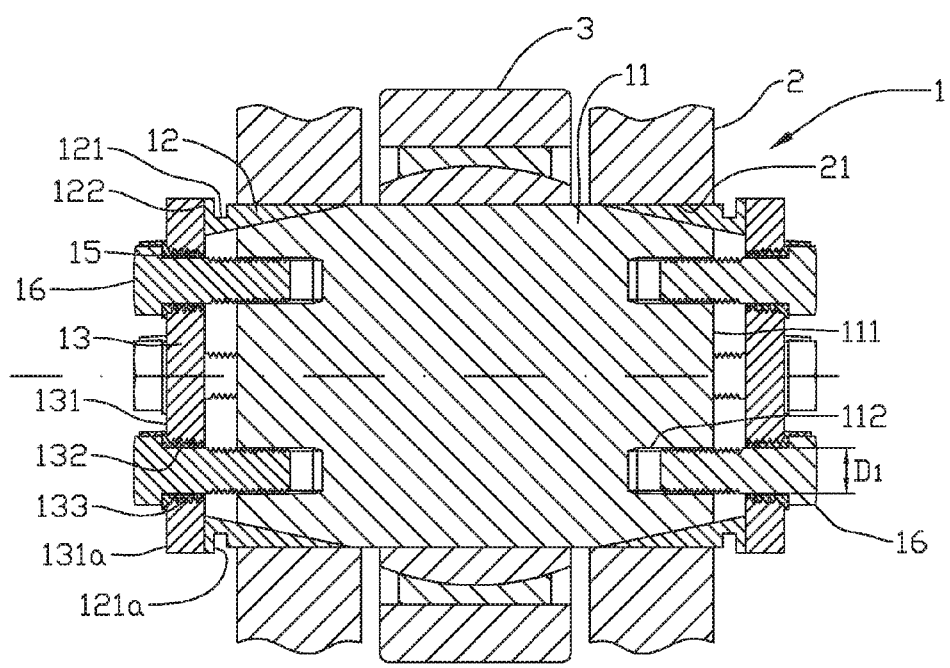
FIG. 2 shows, on a larger scale, an axial section through the pivot pin and articulation elements that are connected by means of the pivot pin.
Figure 3:
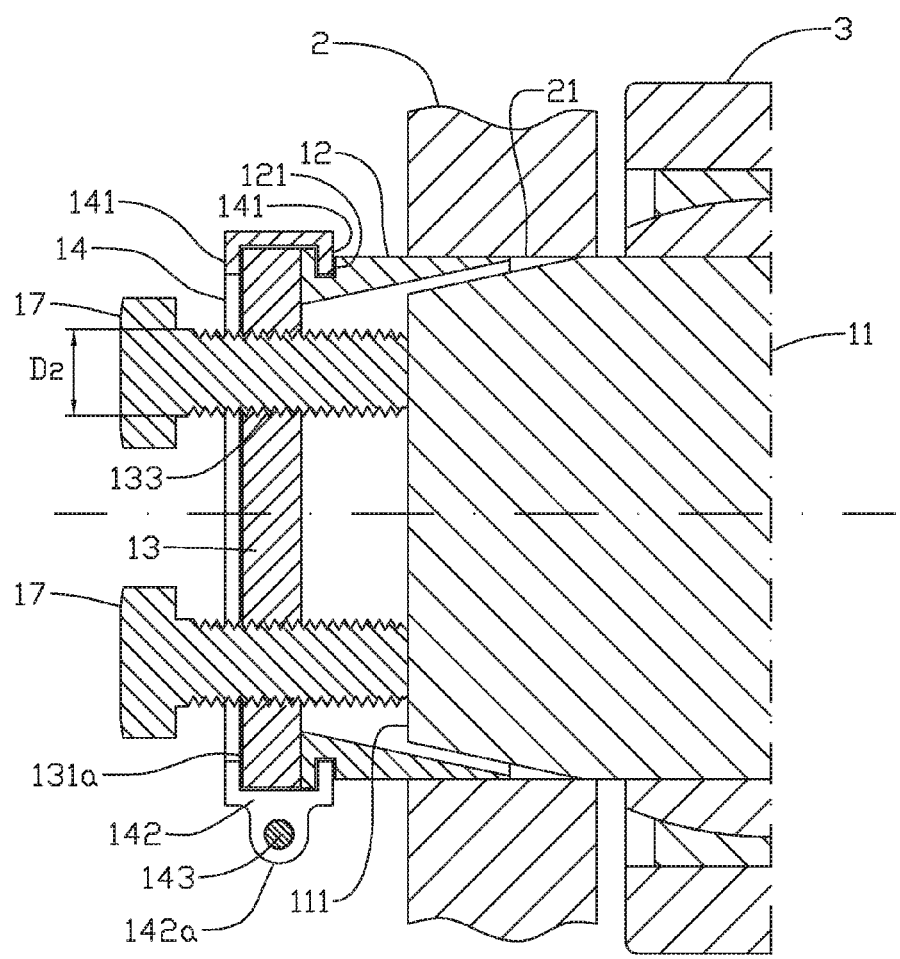
FIG. 3 shows, on a larger scale, an axial section of parts of the pivot pin, the bushing being in the process of being pulled out.

In FIGS. 1-3, the reference numeral 1 indicates a pivot pin for pivotably connecting first and second articulation elements 2, 3 (see FIG. 2 in particular). The pivot pin 1 comprises a pin shaft 11 with conical end portions for receiving conical, expandable bushings 12. When the pivot pin 1 is being connected to the articulation elements 2, 3, an end plate 13 is pressed against an outward end face 122 on each of the bushings 12 by means of first bolts 16 extending through cut-outs 132 in the end plate 13 and into respective threaded bores 112 with a thread diameter $D_1$ in the end faces 111 of the pin shaft 11. In FIGS. 1 and 2, the end plate 13 is held fixed by six bolts 16, the cut-outs 132 being equally spaced apart on a pitch circle having a centre coinciding with the centre axis of the pivot pin 1. The bushings 12 are thereby pressed in a manner known per se against bores 21 in the first articulation element 2 in order thereby to take up play, if any.

Close to their outward end faces 122, the bushings 12 are provided with an engagement portion 121 for a pull-off device (see below), shown as an external groove here. The groove 121 is typically continuous, but may also be interrupted. An abutment face 121a for the pull-off device faces away from the end face 122.

Reference is now made to FIG. 3, in which a bushing 12 is in the process of being pulled out of the bore 21 in the first articulation element 2. A coupling element 14, shown as a splitable coupling ring 14 here, encloses the end plate 13. The coupling element 14 is provided with edge portions 141 projecting inwards, one of the edge portions 141 resting against an edge portion 131a of the end face 131 of the end plate 13, whereas the second edge portion 141 of the coupling element 14 has been inserted into the groove 121 of the bushing 12. At least one second screw 17, two shown in FIG. 3, has been screwed into threaded holes 133 in the end plate 13 into abutment against the end face 111 of the pin shaft 11. The coupling element 14 is provided with a split 142, which, when the bushing 12 is being pulled off, is held together by a locking means 143, shown here as a screw which has been passed through bores in lugs 142a at the split 142. By the second screw(s) 17 being screwed further in, the bushing 12 is pulled loose from the pin shaft 11 and the articulation element 2.

FIGS. 4a-4d show different embodiments of the coupling element 14. A multi-hinge coupling element 14 is shown in FIG. 4a, a single-hinge coupling element 14 is shown in FIG. 4b, the bipartite coupling element 14 connected at two diametrically opposite splits 142 is shown in FIG. 4c, and the coupling element 14 with one split 142 is shown in FIG. 4d.

Figure 5:
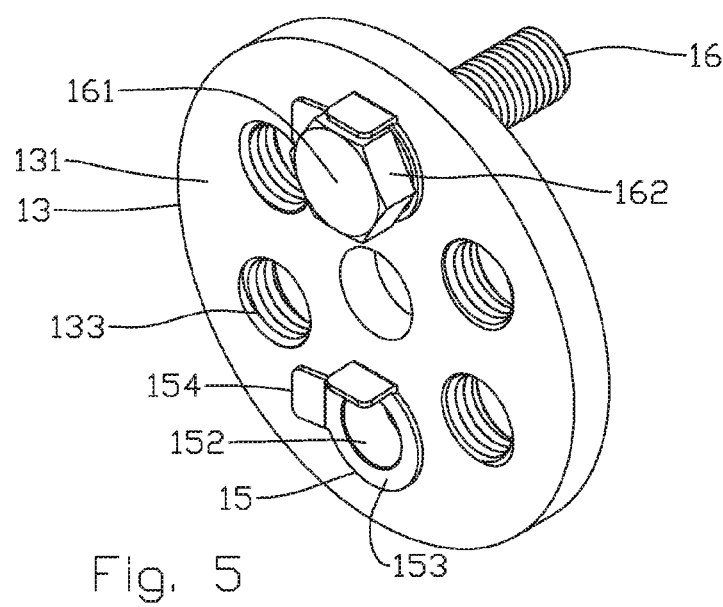
FIG. 5 shows a perspective drawing, on a larger scale, of an end plate in which one threaded screw hole is provided with a screw-hole bushing and another screw hole is provided with a screw-hole bushing and a locked first screw.
Figure 6:
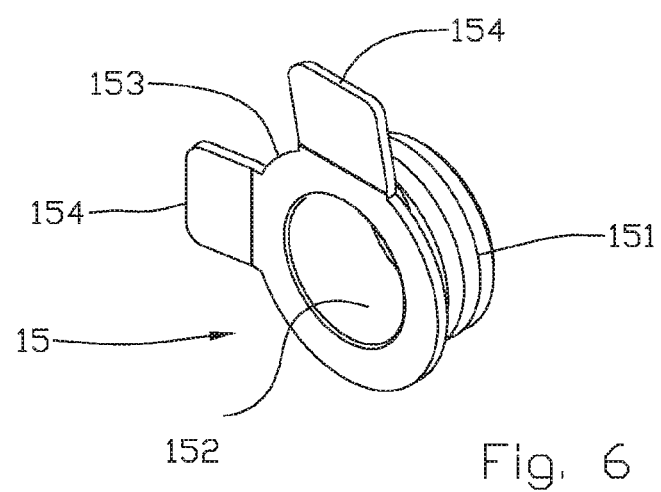
FIG. 6 shows a perspective drawing, on a larger scale, of the screw-hole bushing.

The cut-outs 132 for the first screw 16 and the threaded hole 133 for the second screw 17 are shown as coinciding here and exhibit a thread diameter $D_2$ corresponding to the thread dimension of the second screw 17. When the end plate 13 is attached by means of the first bolt(s) 16, a screw-hole bushing 15 (see especially FIGS. 2, 5 and 6) with an external thread portion 151 with the thread diameter $D_2$ is screwed into the threaded screw hole 133 until a salient end portion 153 is resting against the end face 131 of the end plate 13. The screw-hole bushing 15 has a smooth centre bore 152 arranged to receive the first screw 16. Projecting from the salient end portion 153, there is at least one lip 154, two lips 154 shown here, which is arranged to be bent into locking abutment against a side face 162 on a screw-head 161 of the first screw 16 (see FIG. 5 in particular).

In a preferred embodiment, the second screw 17, the corresponding threaded screw hole 133 in the end plate 13 and the external threaded portion 151 have been threaded in a direction opposite to that of the first screw 16. In one embodiment, the first screw 16 has right-hand threads, whereas the second screw 17, the corresponding threaded screw hole 133 in the end plate 13 and the external thread portion 151 have left-hand threads. Thereby, any tendency for the first screw 16 to loosen and unscrew itself when locked by means of the lips 154 of the screw-hole bushing 15 will result in the screw-hole bushing 15, which has an opposite thread direction, screwing itself inwards. As long as the first screw 16 is locked to the screw-hole bushing 15 by means of at least one lip 154 bent up against the screw head 161, the first screw 16 cannot come loose.

If desirable, the coupling element 14 may be permanently mounted on the pivot pin 1 in such a way that the end plate 13 can be rotated around its centre axis before the second screw 17 is inserted before the bushing 12 is pulled, so that the second screw 17 will not touch the threaded bores 112 in the pin end face 111. It is an advantage if the clearance between two adjacent bores 112 is at least equal to the diameter $D_2$ of the second screw 17.

When a bushing 12 is to be removed, the end plate 13 and said bushing 12 are connected by means of the coupling element 14. The respective first screw, possibly the respective first screws 16 is/are unscrewed from the end face 111 of the pivot pin 1. Screw-hole bushings 15, if any, are unscrewed from the end plate 13. The second screw, possibly the second screws 17 is/are screwed into their respective threaded screw holes 133 into abutment against the end face 111 of the pivot pin 1, as is shown in FIG. 3. For the threaded bore, possibly the threaded bores 112 not to be damaged by the second screw(s) 17, the end plate 13 is rotated through a suitable angle before the second screw(s) 17 is/are screwed in. Then said second screw(s) 17 is/are screwed further in towards the end face 111 so that the end plate 13 and the bushing are forced away from the hinge-pin shaft 11.

Figure 7:
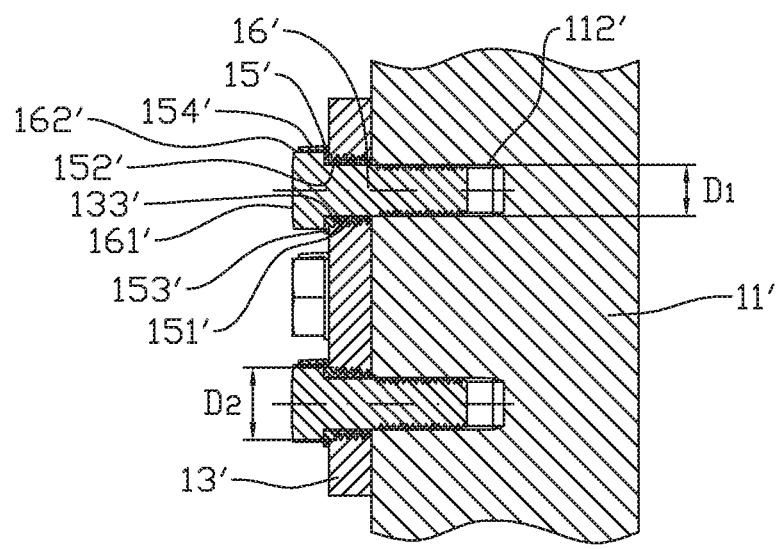
FIG. 7 shows a sectional side view of a locking device for screws connecting two elements.

In its preferred embodiment, that is to say the one in which a screw-hole bushing and a threaded screw hole in a first element has a thread direction which is the opposite of the thread direction of a bolt that is to connect the first element and a second element and a threaded bore in the second element, the screw-hole bushing may also be applied as a general locking device for the bolt connecting said elements. Reference is made to FIG. 7, in which, in a first element 13', several threaded screw holes 133' with a thread diameter $D_2$ and a first thread direction are arranged. An adjacent second element 11' is provided with threaded bores 112' corresponding to said threaded screw holes 133' and being arranged to receive screws 16' having a thread diameter $D_1$ and a second thread direction. The thread diameter $D_2$ is larger than the thread diameter $D_1$, and the first thread direction is the opposite of the second thread direction. A screw-hole bushing 15' with an external thread portion 151' with the thread diameter $D_2$ is screwed into the threaded screw hole 133' until a collar 153' is resting against the first element 13'. The screw-hole bushing 15' has a smooth centre bore 152' arranged to receive the screw 16'. Projecting from the collar 153', there is at least one lip 154', which is arranged to be bent into locking abutment against a side face on the head of the screw 16'.

When a screw connection is provided with said screw-hole bushing 15', a tendency for the screw 16' to come loose will, because of the contact between the lip 154' and the head of the screw' 166', result in the screw-hole bushing 15' rotating together with the screw 16'. But because of the screw-hole bushing 15' being threaded in the opposite direction to the screw 16', such a rotation will result in the screw-hole bushing 15' being screwed inwards and being further secured in the first element 13'. Thereby an effective and reliable locking of the screw 16' is achieved.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive. The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A pull-off device for a radially expandable bushing on a pivot pin, the pull-off device comprising:
    an end plate arranged to rest against a bushing end face, the end plate being arranged to be attached to a pin end face by at least one first screw which extends through a cut-out in the end plate and into a threaded bore with a first thread diameter in the pin end face,
    a coupling element that forms a releasable, axial connection between the end plate and the bushing,
    the end plate having at least one threaded screw hole with a second thread diameter arranged in the axial direction of the end plate and being arranged to receive a second screw which, by axial displacement towards the pin end face, subjects the end plate and the bushing to a force directed axially outwards.

2. The pull-off device according to claim 1, wherein the coupling element is resting against an outward end face of the end plate and against one or more abutment faces facing away from the outward end face of the conical bushing.

3. The pull-off device according to claim 1, wherein several cut-outs for the first screw and several threaded screw holes for the second screw are arranged at a radial distance from the center axis of the pivot pin.

4. The pull-off device according to claim 1, wherein several cut-outs for the first screw and several threaded screw holes for the second screw coincide and are arranged, evenly distributed, on a pitch circle around the center axis of the pivot pin.

5. The pull-off device according to claim 1, wherein several cut-outs for the first screw and several threaded screw holes for the second screw coincide and are arranged, evenly distributed, on a pitch circle around the center axis of the pivot pin with an inter-center distance equal to at least twice the thread diameter of the threaded screw hole.

6. The pull-off device according to claim 1, wherein the thread diameter of the first screw is smaller than the thread diameter of the second screw.

7. The pull-off device according to claim 1, wherein the threaded screw hole is arranged to receive a screw-hole bushing provided with an external thread portion, corresponding to the thread dimension of the threaded screw hole, and with an internal bore extending through it, forming the cut-out for the first screw.

8. The pull-off device according to claim 7, wherein a thread direction of the second screw, the external thread portion of the screw-hole bushing and the threaded screw hole in the end plate is the opposite of a thread direction of the first screw and the threaded bore of the pin end face; and an end portion of the screw-hole bushing is salient and is provided with at least one lip which is arranged for releasable abutment against a side face on a screw head.

9. A locking device for a screw which exhibits a first thread diameter and which extends through a screw hole in a first element and into a threaded bore in a second element wherein, the screw hole is threaded with a second thread diameter and is arranged to receive a screw-hole bushing provided with an external thread portion, corresponding to the thread dimension of the threaded screw hole, and with an internal bore extending through it, forming a cut-out for the screw, the second thread diameter being larger than the first thread diameter;

a thread direction of the external thread portion of the screw-hole bushing and the threaded screw hole in the first element is the opposite of a thread direction of the screw and the threaded bore of the second element; and an end portion of the screw-hole bushing is salient and is provided with at least one lip which is arranged for releasable abutment against a side face on a screw head of the screw.

* * * * *